United States Patent [19]

Nakamura

[11] Patent Number: 4,587,689
[45] Date of Patent: May 13, 1986

[54] MEAT PACKING APPARATUS

[76] Inventor: Minoru Nakamura, 27-6, Seta 1-chome, Setagaya-ku, Tokyo, Japan

[21] Appl. No.: 569,163

[22] Filed: Jan. 9, 1984

[30] Foreign Application Priority Data

Jan. 12, 1983 [JP] Japan ................................. 58-2956

[51] Int. Cl.$^4$ .............................................. A22C 11/02
[52] U.S. Cl. ........................................... 17/41; 17/33; 53/563; 53/567; 53/138 R
[58] Field of Search ........................................ 17/33–42, 17/49; 53/563, 576, 567, 469, 138 R, 138 A

[56] References Cited

U.S. PATENT DOCUMENTS

| Re. 30,390 | 9/1980 | Kupcikevicius | 17/41 |
|---|---|---|---|
| 3,777,331 | 12/1973 | Falborg | 17/33 |
| 3,919,739 | 11/1975 | Kawai | 17/33 |
| 3,975,795 | 8/1976 | Kupcikevicius | 17/49 |
| 4,317,256 | 3/1982 | Senders | 17/41 |
| 4,437,209 | 3/1984 | Duroyon | 17/33 |
| 4,442,568 | 4/1984 | Petry | 17/33 |

FOREIGN PATENT DOCUMENTS

| 1177029 | 8/1964 | Fed. Rep. of Germany | 17/41 |
|---|---|---|---|
| 2645714 | 11/1977 | Fed. Rep. of Germany | 17/41 |

Primary Examiner—Francis S. Husar
Assistant Examiner—Jerry Kearns
Attorney, Agent, or Firm—Yuter, Rosen & Dainow

[57] ABSTRACT

A meat packing apparatus for connecting a shirred casing to a nozzle and stuffing the casing with meat extruded from the nozzle includes shirred casing delivery means for connecting the shirred casing to the nozzle and for deshirring a portion of the casing located aft of the portion thereof connected to the nozzle, fastening means for closing and fastening an end of the deshirred portion on the nozzle side of a meat mass stuffed into this portion from the nozzle, and for closing and fastening the end of the deshirred portion on the side of the meat mass opposite the nozzle, casing tensioning means having a constricting mechanism for constricting the diameter of the deshirred portion on the side of the meat mass opposite the nozzle, and a withdrawal mechanism which cooperates with the constricting mechanism for pulling the deshirred portion backwardly away from the nozzle, and cutting means for cutting the shirred casing at a position rearward of the meat mass on the side thereof opposite the nozzle.

11 Claims, 19 Drawing Figures

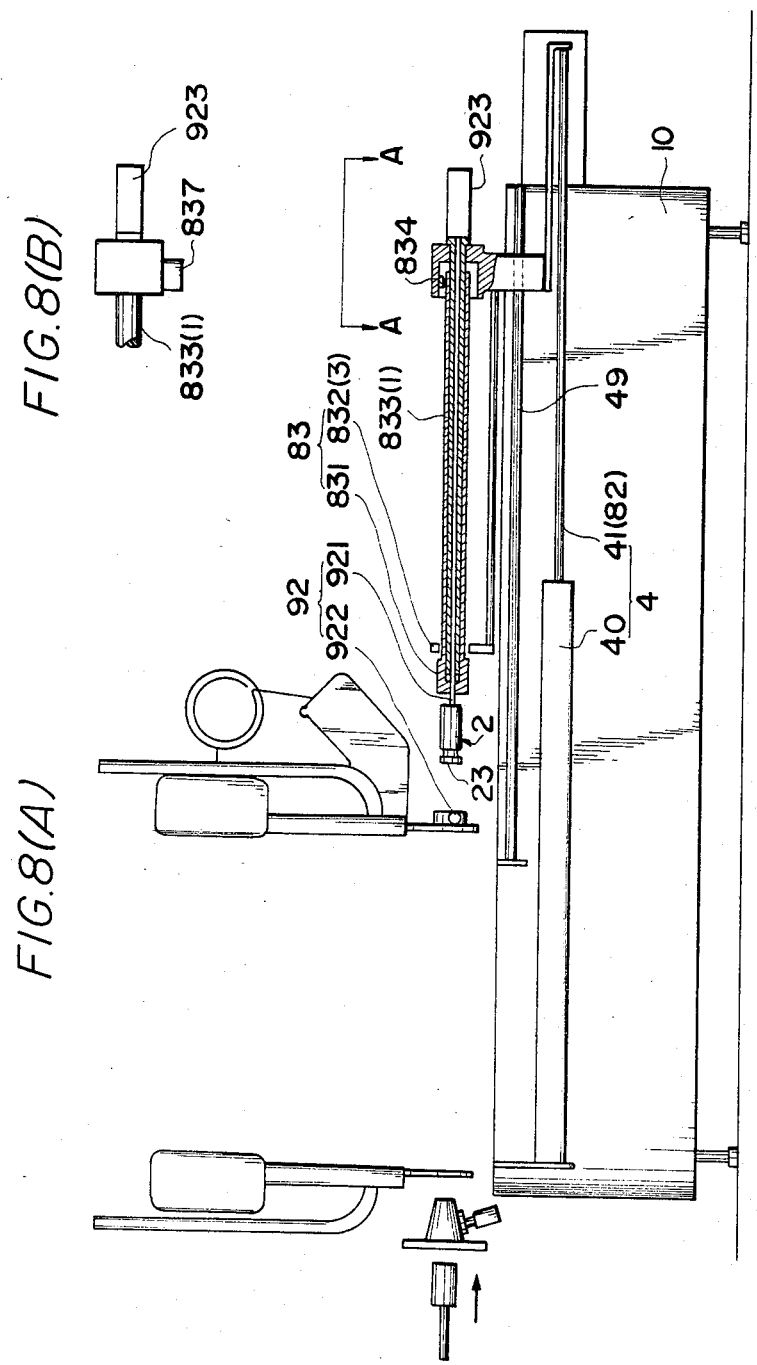

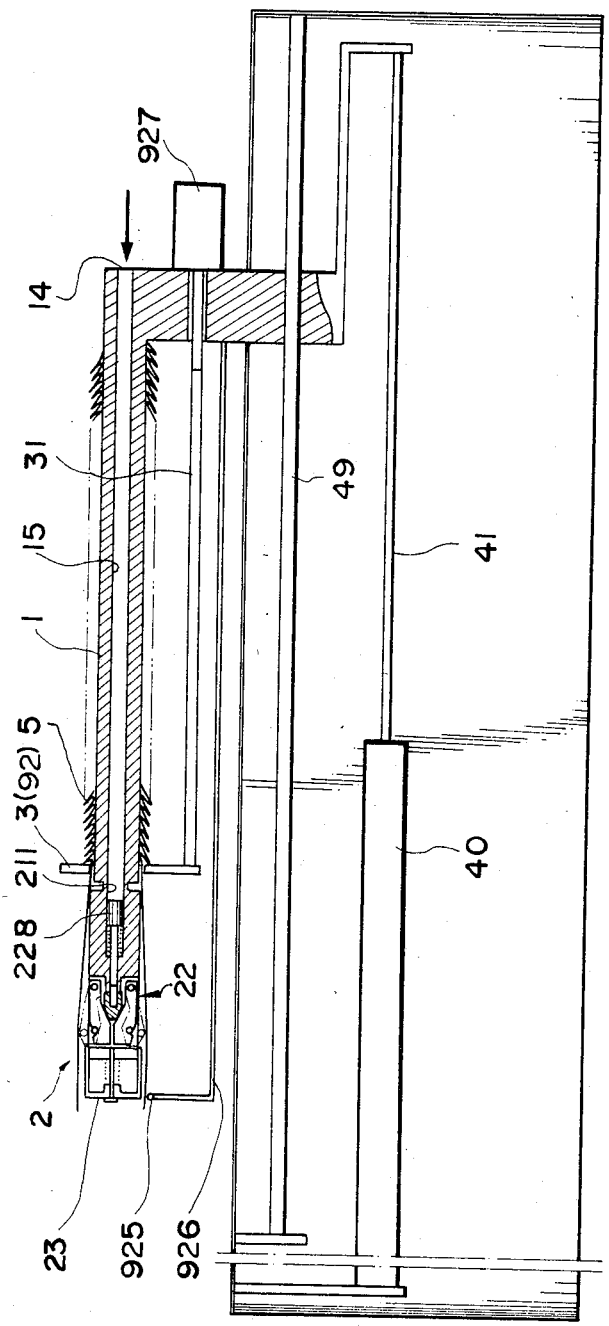

MEAT PACKING APPARATUS

BACKGROUND OF THE INVENTION

This invention relates to a meat packing apparatus of the type in which a shirred casing is connected to a nozzle from which meat is extruded to stuff the casing. The term "meat" as used herein is taken to mean all varieties of meat such as ham and sausage, as well as mixtures of meat, binder and other additives, which are extruded in the form of a viscous emulsion.

In the prior-art packing apparatus of the foregoing type, the shirred casing is supported while one end thereof is loosely fitted over the outer periphery of a nozzle. Pressure which is developed by stuffing the casing with meat extruded from the nozzle forms the casing into a straight, deshirred tubular configuration which is packed with the meat as the formation process proceeds. However, since a shirred casing is an extremely long casing which is shirred by being folded back on itself longitudinally at a multiplicity of points to effect a reduction in length, the wall thickness of the casing when in this shirred or folded state is large in comparison with the diameter of the casing when fully extended, i.e., deshirred. Since the nozzle is loosely fitted inwardly of the casing wall, a large difference develops between the inner diameter of the nozzle and the diameter of the straight tube into which the shirred casing is formed when the casing is extended by being stuffed with the meat. Owing to this large disparity in diameter, the meat extruded into the casing has a diameter which is much smaller than that of the straight, tubular portion, making it difficult to achieve tight packing of the casing. Proposed solutions to the problem are disclosed in Japanese Patent Application Laid-Open Nos. 50-32315 and 52-27715, which describe systems for stuffing a casing with meat by disposing a casing at a position forwardly of the direction in which meat is extruded from the nozzle and connecting the casing to the nozzle to effect the stuffing operation. In the disclosed arrangements, the casing is held sandwiched between an inner cylinder and an outer cylinder fitted over the inner cylinder. The casing is paid out toward the nozzle by driving the outer cylinder, with an assist from the action of an engaging member that engages the inner cylinder. Accordingly, the proposed arrangements have an extremely complicated operating mechanism and, being applicable solely to casings of a straight, tubular configuration, are not suitable for stuffing a shirred casing with meat.

SUMMARY OF THE INVENTION

An object of the present invention is to provide a meat packing apparatus which is simple in construction and easy to operate.

Another object of the present invention is to provide a meat packing apparatus wherein a shirred casing can be continuously and automatically stuffed with a mass of meat having a diameter close to that of the casing diameter.

A further object of the present invention is to provide a meat packing apparatus wherein economical use is made of the casing by eliminating excess casing length when the casing is severed.

According to the present invention, the foregoing objects are attained by providing meat packing apparatus for connecting a shirred casing to a nozzle and stuffing the casing with meat extruded from the nozzle, the apparatus comprising shirred casing delivery means, fastening means, shirred casing tensioning means and cutting means.

The shirred casing delivery means connects the shirred casing to the nozzle by advancing the shirred casing toward the nozzle from a position forward of the direction in which meat is extruded from the nozzle, and forms a portion of the shirred casing, which is located immediately rearward of the portion thereof connected to the nozzle, into a straight, tubular portion so that the casing may be stuffed with meat extruded from the nozzle. The shirred casing delivery means comprises a support, a clamping unit, a drive unit and a resisting body.

The support is adapted to support the shirred casing, from the inner side thereof, at a position toward which meat is extruded from the nozzle. No limitation is placed upon the shape of the support, which may for example be a cylindrical or frame-like body. The outer dimensions of the supporting surface, such as the outer diameter of a cylinder if this is the configuration adopted for the support, need not be highly precise. What is required is that the support be capable of supporting the shirred casing from its inner side. Accordingly, the support is such as is capable of supporting any shirred casing irrespective of the inner diameter of the casing.

The clamping unit applies pressure to the inner side of the shirred casing, which is supported on the support, to hold the leading end of the casing opposite the end of the nozzle. Means for producing the holding force by applying pressure to the inner side of the casing are provided. For example, means are provided for pressing the inner wall of the casing by expanding within the casing in response to mechanical or fluid pressure. Since the leading end of the shirred casing is retained so that the drive unit may deliver this end of the casing to the nozzle for the connection thereto, it goes without saying that the holding force applied to the inner side of the casing by the clamping unit must be large enough to achieve the stated purpose. However, the holding force need only be applied at least when the clamping unit is advancing the casing forwardly, that is, toward the nozzle. During retraction, the holding force is removed or, if desired, applied only lightly.

The drive unit is connected to the clamping unit to advance the clamping unit toward the nozzle and then retract the clamping unit after the shirred casing is connected to the nozzle. More specifically, the drive unit has a path for transmitting a driving force to the clamping unit to advance and retract the clamping unit interiorly of the shirred casing, the transmission path being located on the inner side of the shirred casing. With such a construction, the source of drive for the driving unit may be disposed on the inner or outer side of the shirred casing. However, the element which finally transmits the driving force to the clamping unit is connected to the clamping unit interiorly of the shirred casing.

The resisting body resistively engages the folds in the wall of the shirred casing during the advance or retraction of the clamping unit so that, owing to the relative movement between the shirred casing and the resisting body engaging the folded wall, the shirred casing is deshirred and formed into a straight, tubular portion defining a space into which meat is extruded for packing.

The fastening means comprises first and second fastening units which, once a meat mass has been stuffed into the straight, tubular portion of the casing, are operable to close and fasten the casing on both sides of the meat mass. After the casing has been stuffed, the first fastening unit closes and fastens the end of the straight, tubular portion of the shirred casing on the nozzle side of the meat mass. Thereafter, the second fastening unit closes and fastens the end of the straight, tubular portion of the shirred casing on the side of the meat mass opposite the nozzle, this taking place after the operation of the shirred casing tensioning means, described in further detail hereinbelow. Accordingly, the distance between the first and second fastening units can be set depending upon the quantity of meat to be encased, namely the stuffed casing length. No particular restriction is placed upon the fastening unit mechanisms, which may be of well-known type.

The shirred casing tensioning means is for the purpose of tensioning the casing by means of the internal pressure of the meat mass, which has been stuffed into the straight, tubular portion of the casing, before the second fastening unit operates, thereby to pack the meat into this portion of the casing as firmly as possible. The tensioning means comprises a constricting mechanism operable simultaneously with the first fastening unit or following operation of this unit for constricting the diameter of the straight, tubular portion of the shirred casing on the side of the encased meat mass opposite the nozzle, and a withdrawal mechanism which cooperates with the constricting mechanism for pulling the straight, linear portion of the shirred casing backwardly, namely in a direction away from the nozzle. As for the constricting mechanism, any construction will suffice that constricts the straight, tubular portion of the casing diametrically. This can be a mechanism such as a plate or the like provided with parallel grooves or a hole capable of permitting the straight, tubular portion of the casing to pass therethrough, the distance between the grooves or the diameter of the hole being reduced when required to constrict the tubular portion of the casing. It is also possible to use, without modification, the constricting mechanism provided on a well-known fastening device.

The withdrawal mechanism is for firming the encased product by pulling the straight, linear portion of the casing rearwardly, namely in the direction away from the nozzle, and is therefore located aft of the second fastening unit and cutting means. The withdrawal mechanism may be of any construction that holds and retracts the casing. For example, the withdrawal mechanism may have a configuration that allows the clamping unit to hold and retract the casing, or may comprise a separately provided mechanism for grasping the casing from the inner and outer sides thereof and for subsequently retracting the casing.

The cutting means is positioned slightly aft of the second fastening unit for severing the casing following the operation of this fastening unit. Any known mechanism may be employed as the cutting means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8(A) is a front view of a third embodiment of a meat packing apparatus according to the present invention, the apparatus being shown in its entirety, and FIG. 8(B) is a perspective view of a portion of the meat packing apparatus seen along line A-A of Fig. 8(A);

FIG. 12 is a front view, partially shown in section, of shirred casing delivery means included in a meat packing apparatus according to a fourth embodiment of the present invention.

DESCRIPTION OF THE PREFERRED EMBODIMENTS

Figure 1:
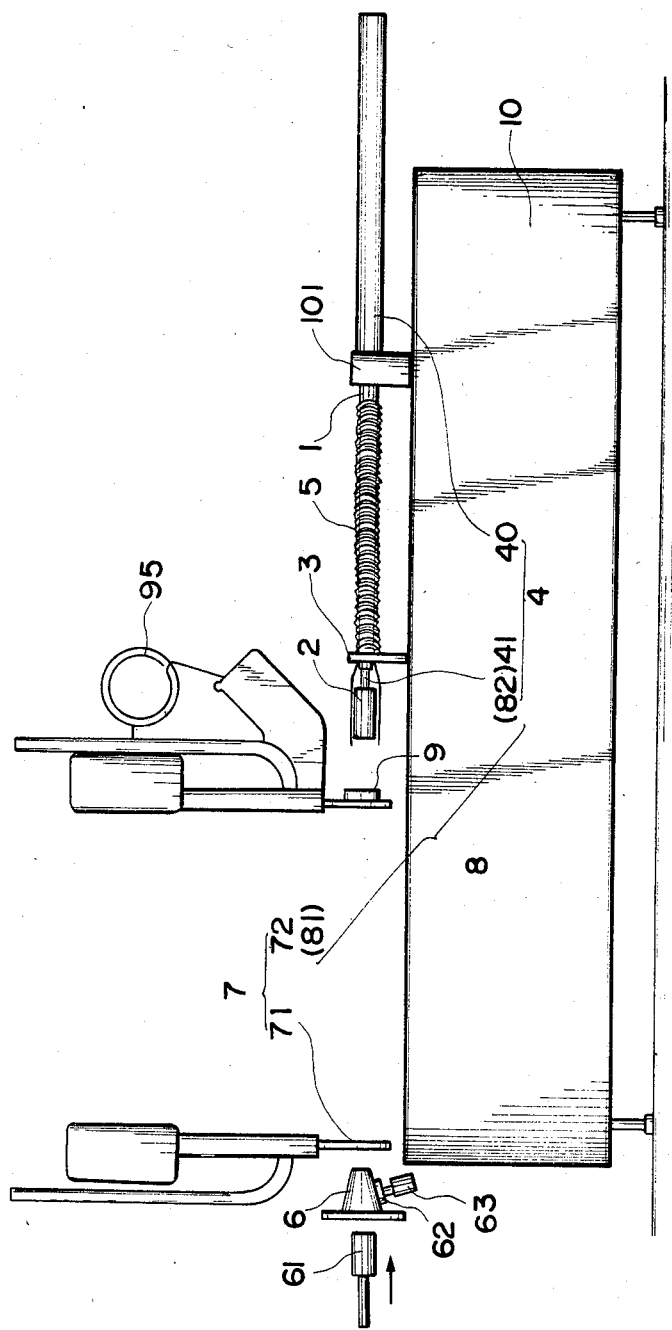
FIG. 1 is a front view of a first embodiment of a meat packing apparatus according to the present invention, the apparatus being shown in its entirety.

Reference will be had to the drawings to describe embodiments of the meat packing apparatus according to the present invention. FIG. 1 shows a first embodiment of the meat packing apparatus in its entirety, inclusive of shirred casing delivery means, and FIG. 2 shows the arrangement of the shirred casing delivery means as well as the operation thereof.

As shown in FIG. 1, the shirred casing delivery means includes a stationary support 1, a clamping unit 2, a resisting body 3 and a drive unit 4. The support 1 has a cylindrical configuration and supports a shirred casing 5 from the inner side thereof. A piston 61 operatively associated with a nozzle 6 is adapted to extrude meat from the nozzle 6 in the direction of the arrow. The support 1, which is disposed at a position forwardly of the direction in which the meat is extruded from the nozzle 6, namely to the right of the nozzle in FIG. 1, is fixedly attached to a holder 101 secured to a frame 10 at a set position. The exact position at which the support 1 is disposed is decided by setting the holder 101 at any suitable position determined in accordance with the quantity of meat to be stuffed into the casing 5. The clamping unit 2 is disposed within the shirred casing 5 at the forward or leading end of the apparatus on the side of the nozzle 6. The clamping unit 2 will be described in further detail hereinbelow. The drive unit 4 is mounted on the holder 101 and comprises a cylinder 40 serving as a source of drive and accommodating a piston 42 (FIG. 3), and a rod 41 serving as a linearly movable element and connected at one end to the clamping unit 2 and at the other end to the piston 42. The rod 41 penetrates into the interior of the stationary support 1 and is reciprocated by the cylinder 40. Where the support 1 is a cylinder, as in the illustrated embodiment, the rod 41 is situated interiorly of the support. If the support were a member such as a simple frame or bar, then the rod 41 would be located within the shirred casing 5 and disposed in parallel with said member.

The resisting body 3, like the holder 101, is secured to the frame 10 and set fixedly at any desired position. Though the details are not illustrated, the resisting body 3, which is disposed forwardly of the support 1, comprises a plate having an aperture so sized as to permit the shirred casing 5 to pass therethrough while the plate itself offers resistance to the wall of the casing. Accordingly, when the clamping unit 2 is advanced as will be described below, the stationary resisting body 3 is engaged by the folds in the wall of the shirred casing 5 as the casing advances with the clamping unit, thereby causing the casing to unfold into a straight, tubular configuration, namely one having a deshirred, substantially linear wall, on the front side of the resisting body 3, namely on the side thereof facing the nozzle 6.

The clamping unit 2 and drive unit 4 will be described in further detail with reference to FIGS. 3 and 4.

Figure 3:
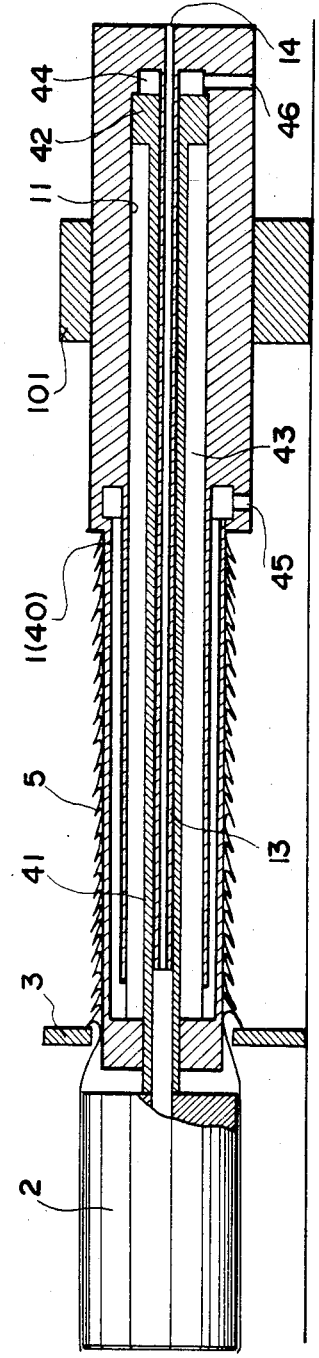
FIG. 3 is a sectional view showing in some detail the internal construction of a support and a drive unit comprising the shirred casing delivery means.

As shown in FIG. 3, the cylindrical support 1 is formed to include a cylinder chamber 11 accommodating the piston 42, whereby the drive source 40 is constructed. The rod 41 is connected at one end to the piston 42 and at the other or forward end to the clamping unit 2, described hereinbelow. Delimited within the cylinder chamber 11 at the front and back sides of the piston 42 are respective pressure chambers 43, 44 communicating with respective pressurizing ports 45, 46 formed in the wall of the support 1 for introducing hydraulic pressure to the pressure chambers. Inserted into the rod 41, which is hollow, is a guide pipe 13 formed integral with the support 1. The rod 41 is capable of sliding along the guide pipe 13. The guide pipe 13, constituting a transmission element, receives hydraulic pressure introduced from a separate hydraulic pressure source through a pressurizing port 14 located at the rear end of the support 1, and transmits the pressure as a linearly and leftwardly acting force to a clamping mechanism 22 constituting the clamping unit 2. In a modification of the invention illustrated in FIG. 5, the transmission element may comprise a guide pipe 13' formed integral with the clamping unit 2.

Figure 4:
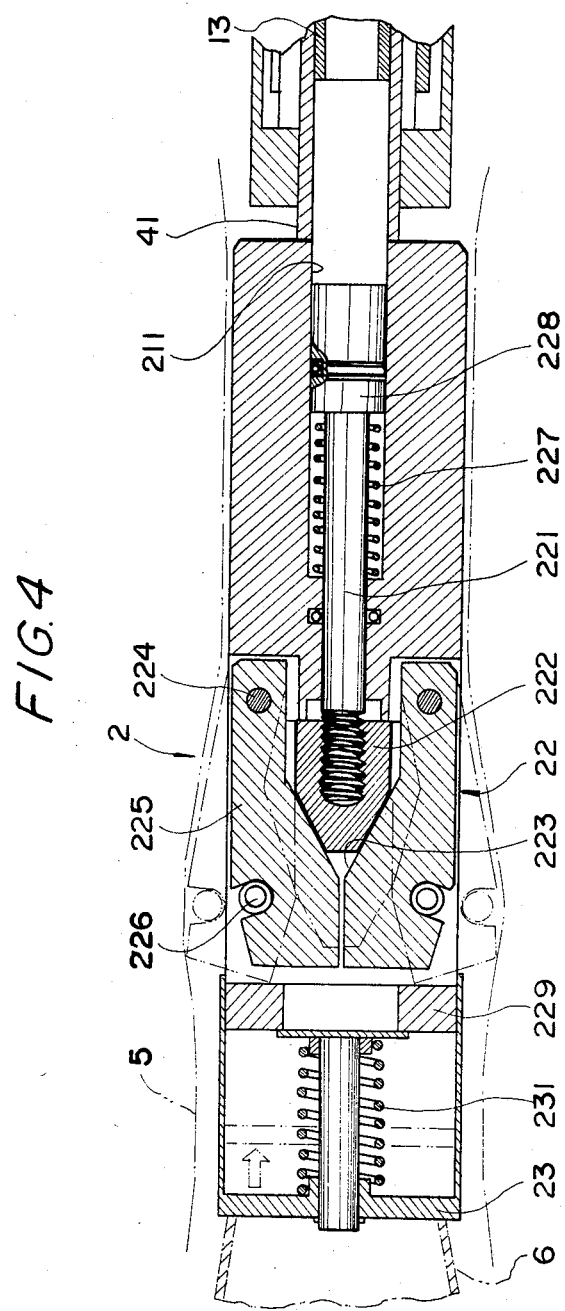
FIG. 4 is a sectional view showing in some detail the construction of a clamping unit comprising the shirred casing delivery means.

As shown in FIG. 4, the clamping mechanism 22 comprises a piston 228 which undergoes leftwardly directed linear motion within the cylinder chamber 211 of the clamping unit 2 in response to the hydraulic pressure introduced from the guide pipe 1 serving as the tranmission element, a rod 221 connected at one end to the front side of the piston 228, a conical member 222 attached to the other or forward end of the rod 221, and an expansion member 225 which has a concave conical surface 223 in abutting surface contact with the conical member 222, and which is rotatable about a pin 224. Thus the expansion member 225 is adapted to expand or protrude outwardly of the clamping unit 2 to the position shown by the phantom lines a the piston 228 is advanced to the left in FIG. 6, as also indicated by the phantom lines. Such protrusion of the expansion member 225 brings the expansion member into contact with the inner surface of the casing 5, as indicatad by the phantom lines, thereby applying a holding force to the casing 5 into which the clamping unit 2 is inserted. The clamping mechanism 22 further includes a spring 226 encircling the expansion member 225 for restoring the latter to its original (reclined) position, which is the position indicated in FIG. 4, when the hydraulic pressure is withdrawn from the pressure chamber 44 (FIG. 3) through the pressurizing port 14, and a spring 227 fit over the rod 221 and interposed between the front side of the piston 228 and the left-hand wall of the cylinder chamber 211 for urging the piston 228 backward to its oriqinal position when the hydraulic pressure is withdrawn as described.

The clamping unit 2 is provided at its tip with a head 23 disposed slidably on a frame 229 constituting the expansion member 225. When brought into abutting contact with the nozzle 6 as the clamping unit 2 is advanced, the head 23 slides backwardly on the frame 229 against a spring 231 and recedes within the casing 5 so that the casing protrudes from the head. This facilitates the operation of fitting the end of the casing over the nozzle 6. The force applied by the spring 231 keeps the head 23 at the left most position when the head is not in abutting contact with the nozzle 6.

Figure 5:
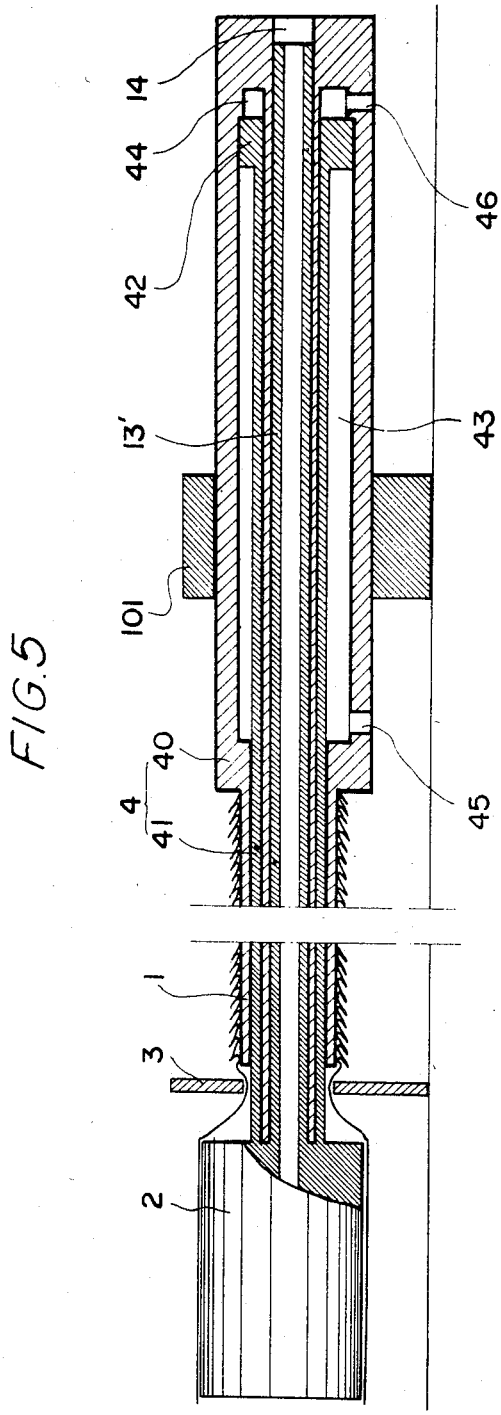
FIG. 5 is a sectional view showing in some detail the internal construction of a modification of the support shown in FIG. 3.

It should be noted in the embodiment of FIG. 3 that the support 1 is formed by utilizing the outer diameter portion of the cylinder 40, so tnat the overall arrangement is reduced in length. In the embodiment of FIG. 5, the support 1 and cylinder 40 are formed separately of each other, with the result that the apparatus is lenthened correspondingly. With this configuration, however, the support 1 is reduced in diameter.

As shown in FIG. 1, the nozzle 6 has a slightly tapered tip to make it easier to insert the nozzle into the leading end of the casing 5. Provided at the side of the tapered nozzle tip is a chuck 62 operated by a cylinder 63 so as to clamp the casing 5 against the tapered surface of the nozzle to prevent the casing from sliding off the nozzle owing to the pressure of the meat extruded by the piston 61 or a tensioning force which acts on the casing when the end of the casing on the nozzle side is closed and fastened, as will be described later.

Disposed between the nozzle 6 and the clamping unit 2 when the latter is in the retracted position (the position shown in FIG. 1) are fastening means 7 comprising a first fastening unit 71 on the side of the nozzle 6 and a second fastening unit 72 on the side of the clamping unit 2. The distance between the first and second fastening units 71, 72 is set to conform to the length of the product formed by stuffing the casing tightly with meat. The second fastening unit 72 houses a constricting mechanism 81 of a casing tensioning means 8 for squeezing or constricting the casing 5, and is further provided with cutting means 9 closely adjacent to the back side of the constricting means 81 for cutting off a segment of the casing.

After the casing has been connected to the nozzle 6, the clamping unit 2 is retracted, as will be described later. Though the holding force to which the casing is subjected by the clamping unit 2 may be reduced or removed entirely when the clamping unit 2 is retracted, the holding force is strengthened as the clamping unit 2 starts to be withdrawn in cooperation with the constricting action of the constricting mechanism 81, thereby to tension the casing in rigid fashion. Note that the casing tensioning means 8 comprises, in addition to the constricting mechanism 81, the rod 41 which serves as a withdrawal mechanism 82 designed so as to pull back the clamping unit 2 as the holding force is being applied to the casing thereby.

In FIG. 1, numeral 95 denotes a looping device for attaching a cord at the location of the second fastening unit 72 for suitable handling of the product following completion of the meat stuffing operation.

Figure 2A:
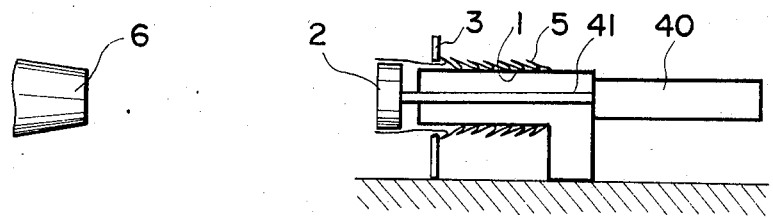
FIGS. 2A-2D are schematic views illustrating the construction and principle of operation of shirred casing delivery means shown in FIG. 1.

The operation of the first embodiment of the invention will be described in conjunction with FIG. 2. The first step is to support the shirred casing 5 on the support 1 and pull the front end of the casing onto the clamping unit 2 through the resisting body 3 so that the clamping unit may hold the casing in place. The clamping mechanism 22 of the clamping unit 2 is operated by hydraulic pressure. The hydraulic pressure, when applied to the pressurizing port 14 (FIG. 3), is introduced into the guide pipe 13 and thrusts the piston 228 forward against the force of the spring 227 (FIG. 4). The forward or advancing motion of the piston 228 is transmitted to the conical member 222 through the rod 221, whereby the conical member 222 is advanced. As a result, the expansion member 225, which is in abutting surface contact with the conical member 222, is rotated outwardly about the pin 224 against the force of the surrounding spring 226, thereby holding the shirred casing 5 from the inner side thereof. This is illustrated in FIG. 2(A).

Figure 2B:
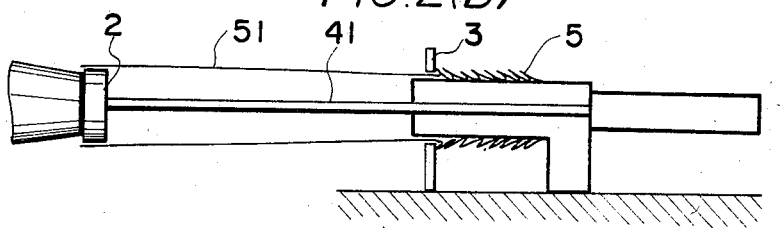

Next, hydraulic pressure is admitted into the pressure chamber 44 on the back side of the piston 42 through the pressurizing port 46, thereby advancing the piston 42 and, hence, the clamping unit 2 through the rod 41 connecting the piston 42 with the clamping unit. This step is shown in FIG. 2(B). More specifically, when the clamping unit 2, coupled to the piston 42 via the rod 41, advances, the shirred or folded wall of the shirred casing 5 meets resistance offered by the resisting body 3. Owing to the movement of the shirred casing 5 relative to the resisting body 3 as the clamping unit 2 advances, the shirred casing 5 is unfolded, i.e., deshirred, and formed into a straight tubular portion 51 at the front of the resisting body 3. Hydraulic pressure continues to be introduced into the pressure chamber 44 to advance the clamping unit 2 further to the left, with the head 23 of the clamping unit 2 eventually coming into abutting contact with the nozzle 6. As the clamping unit 2 is advanced under these conditions, the head 23 is pressed backwardly by the nozzle 6 into the casing 5 against the force of the spring 231, so that the leading end of the casing projects beyond the front end of the head 23. When the protruding end of the casing 5 has been fitted over the tip of the nozzle 6, the hydraulic pressure within the cylinder chamber 11 of the drive source is withdrawn through the port 46 to halt the forward motion of the clamping unit 2. This is followed by actuating the chuck 62 to clamp the casing 5 against the side of the nozzle 6 to effect the connection between the two. Preferably, the introduction of hydraulic pressure into the guide pipe 13 is suspended simultaneously with the operation of the chuck 62 in order to recline the expansion member 225 and, hence, free the casing 5 from the holding force applied by the clamping unit 2.

Figure 2C:
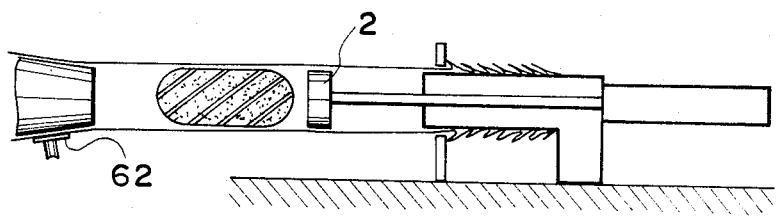

When the casing 5 has been connected to the nozzle 6 in the above-described manner, hydraulic pressure is introduced into the pressure chamber 43 on the front side of the piston 42 through the pressurizing port 45, thereby retracting the piston 42 and, hence, the clamping unit 2. As shown in FIG. 2(C), the clamping unit 2 is retracted far enough to permit the casing to be stuffed with meat, after which packing takes place by extruding the meat into the straight tubular portion 51 of the casing from the nozzle 6 by the action of the piston 61.

Figure 2D:
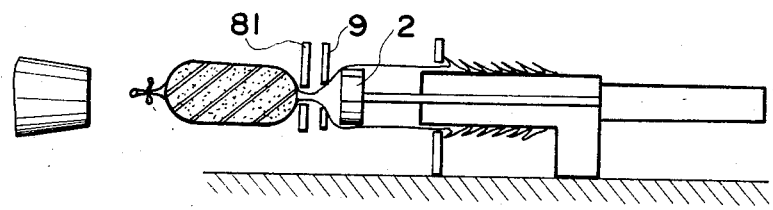

Thereafter, the leading end portion of the casing 5 on the nozzle (left) side of the extruded meat mass is closed and fastened by the first fastening unit 71, and the chuck 62 is withdrawn from the nozzle. This is followed by actuating the constricting mechanism 81 to constrict the casing 5 on the other or right side of the extruded meat mass, namely on the side opposite the nozzle, in cooperation with which the clamping unit 2 is again retracted by the rod 41 acting as the withdrawal mechanism 82, thereby tensioning the casing 5 to assure that the meat mass stuffed therein will be tightly encased. It should be noted that the clamping unit 2 is again actuated to subject the casing to a holding force when this second retraction operation is performed. Following the tensioning of the casing 5, the second fastening unit 72 is operated to close and fasten the right side of the encased meat mass, after which this side of the casing is cut off by the cutting means 9. This completes one packing cycle, the final steps of which are as shown in FIG. 2(D).

Thus, in accordance with the first embodiment of the present invention, the support 1 and clamping unit 2 are of separate construction, and the support 1 is fixed against movement. Only the clamping unit 2 is reciprocated, i.e., advanced and retracted, by the drive unit 4. The resisting body 3, which is stationary like the support 1, offers resistance to the folds in the wall of the shirred casing 5 when the clamping unit 2 is advanced, and thus functions to unfold the casing into a straight or deshirred tubular portion as the casing is carried by the clamping unit.

Figure 6:
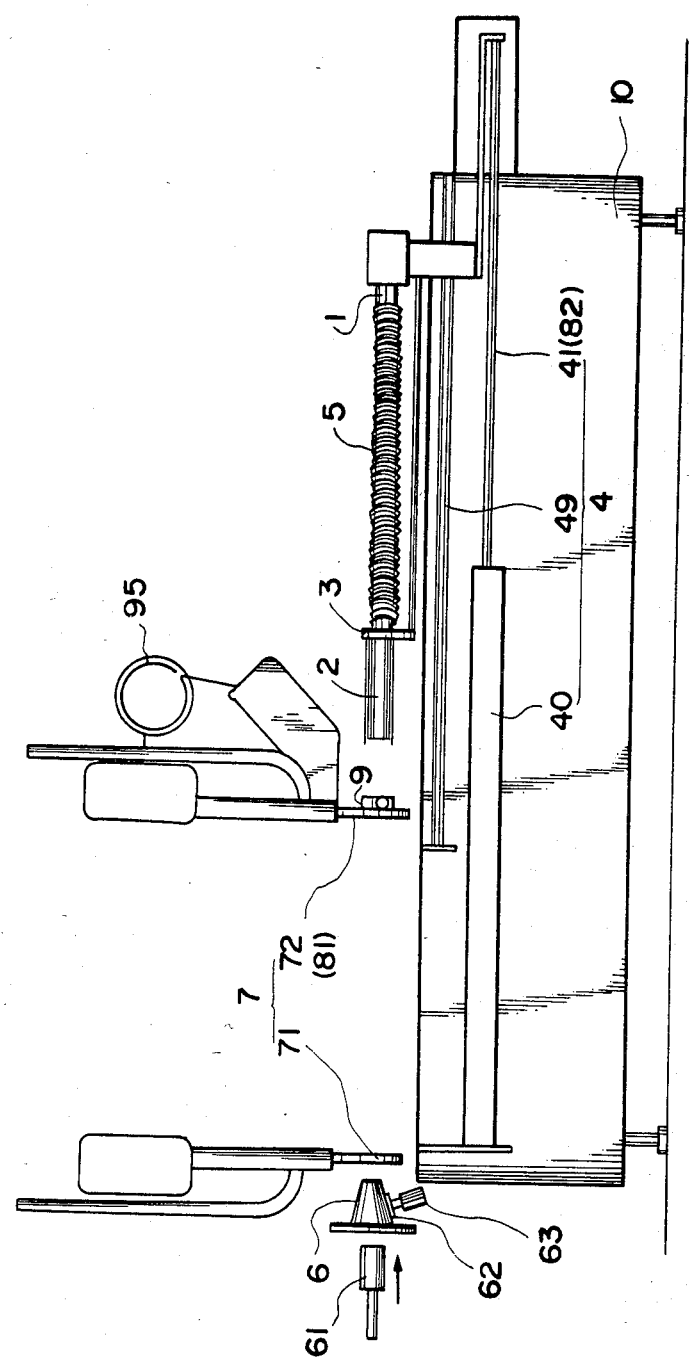
FIG. 6 is a front view of a second embodiment of a meat packing apparatus according to the present invention, the apparatus being shown in its entirety.

Reference will now be had to FIGS. 6 and 7 to describe a second embodiment of the present invention. This embodiment is distinguishable over the first primarily in that the support 1 and clamping unit 2 are formed as a unitary body and, hence, move in unison. The resisting body 3, which is attached to the support 1, moves together with the support and, consequently, in unison with the clamping unit 2. Accordingly, the linearly movable element 41, namely the rod 41 that drives the clamping unit 2, need only be connected to the support 1. The latter is guided along a guide bar 9 and has the rod 41 connected to its lower end for being driven by the cylinder 40 of the drive source. In the illustrated arrangement, the driving force is transmitted to the clamping unit 2 through the interior of the shirred casing 5 by the support 1 formed integral with the clamping unit. Owing to these structural differences which distinguish this arrangement over that of the first embodiment, the principle of operation differs with respect to the formation of the straight portion 51 of the casing 5. This will be described with reference to FIG. 7.

Figure 7A:
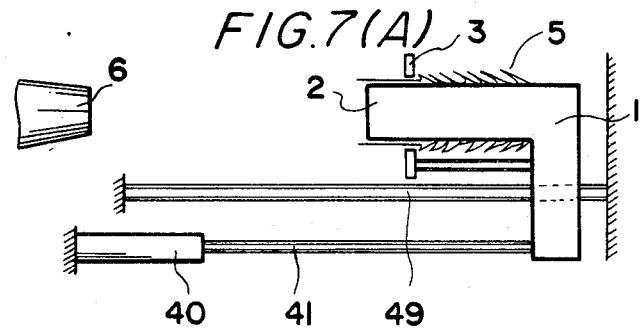
FIGS. 7A-7D are schematic views illustrating the construction and principle of operation of shirred casing delivery means shown in FIG. 6.
Figure 7B:
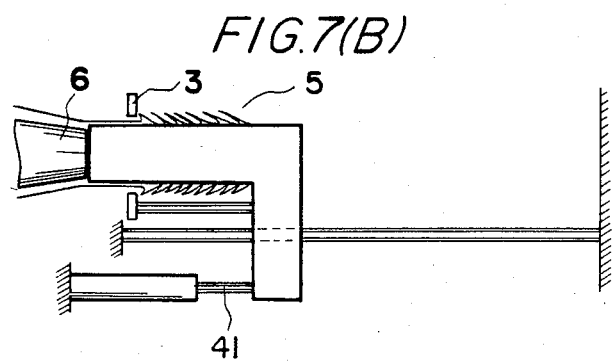
Figure 7C:
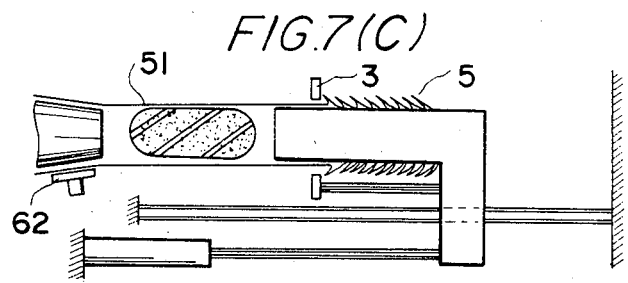
Figure 7D:
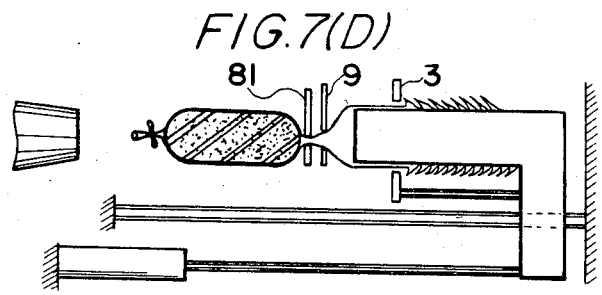

The clamping unit 2 and support 1, starting from the condition shown in FIG. 7(A), move forward toward the nozzle 6 as the rod 41 is advanced, the support 1 being guided along the guide bar 49. The casing 5 travels forwardly with the support 1, clamping unit 2 and resisting body 3 and is as yet not formed into a straight tubular portion. In FIG. 7(B), the clamping unit 2 is brought into contact with the nozzle 6 to connect the casing 5 to the nozzle in a manner similar that performed in the arrangement of the first embodiment. After the connection, the clamping unit 2 and support 1 are retracted, at which time the resisting body 3 is also retracted in unison with these elements owing to its being attached to the support 1. Since the leading end of the casing 5 is firmly clamped onto the nozzle 6, the retraction of the resisting body 3 brings it into abutting contact with the folds in the wall of the shirred casing 5 as the casing is pulled off the retracting support 1. Thus, the retracting resisting body 5 in effect pulls the folds out of the casing 5 and forms the casing into the straight, deshirred tubular portion 51 on the front side of the resisting body 3. This is followed by packing meat into the deshirred portion 51 of the casing by extruding the meat from the nozzle 6 [FIG. 7(C)], and enclosing the meat mass within the casing [FIG. 7(D)]through steps similar to those described in connection with the first embodiment of the invention.

Figure 9:
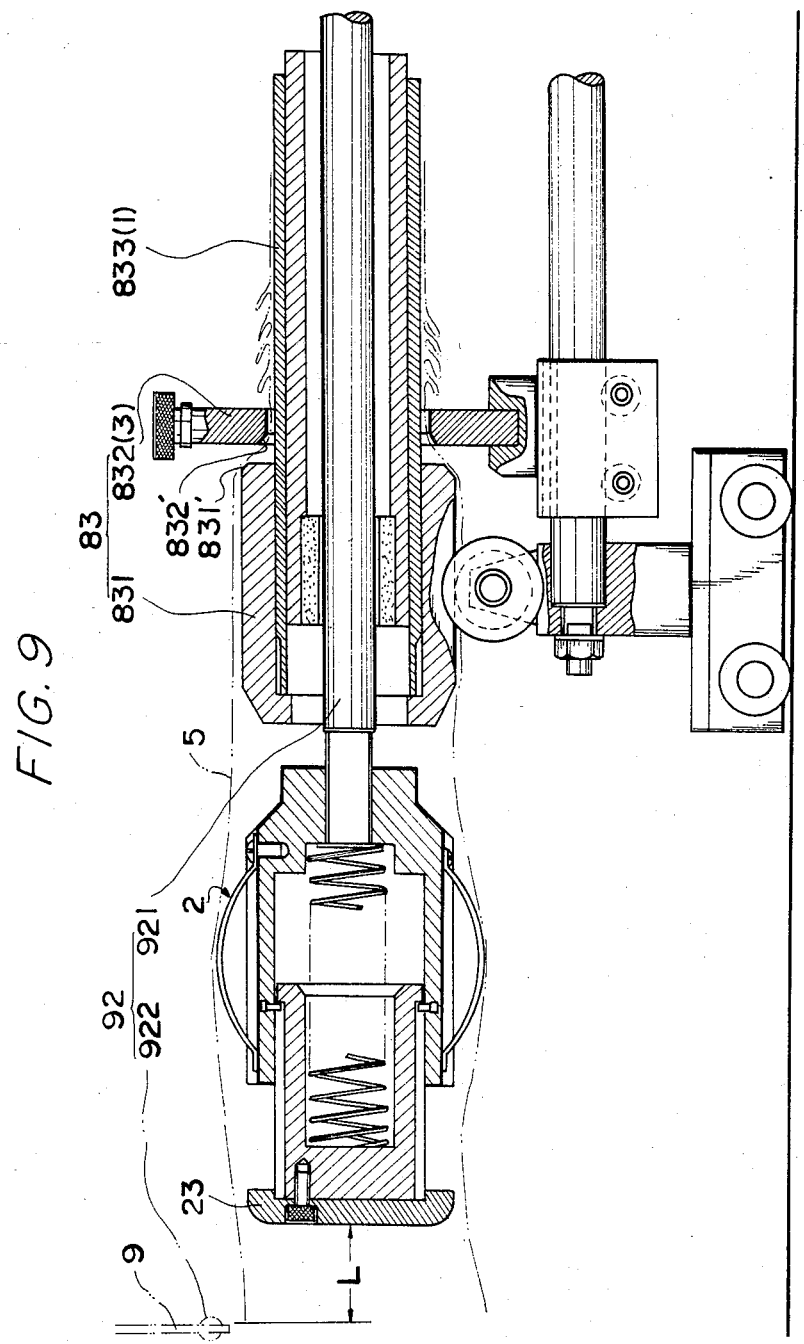
FIG. 9 is a sectional view of aligning means and the chuck of a withdrawal mechanism included in the apparatus of FIG. 8.
Figure 10:
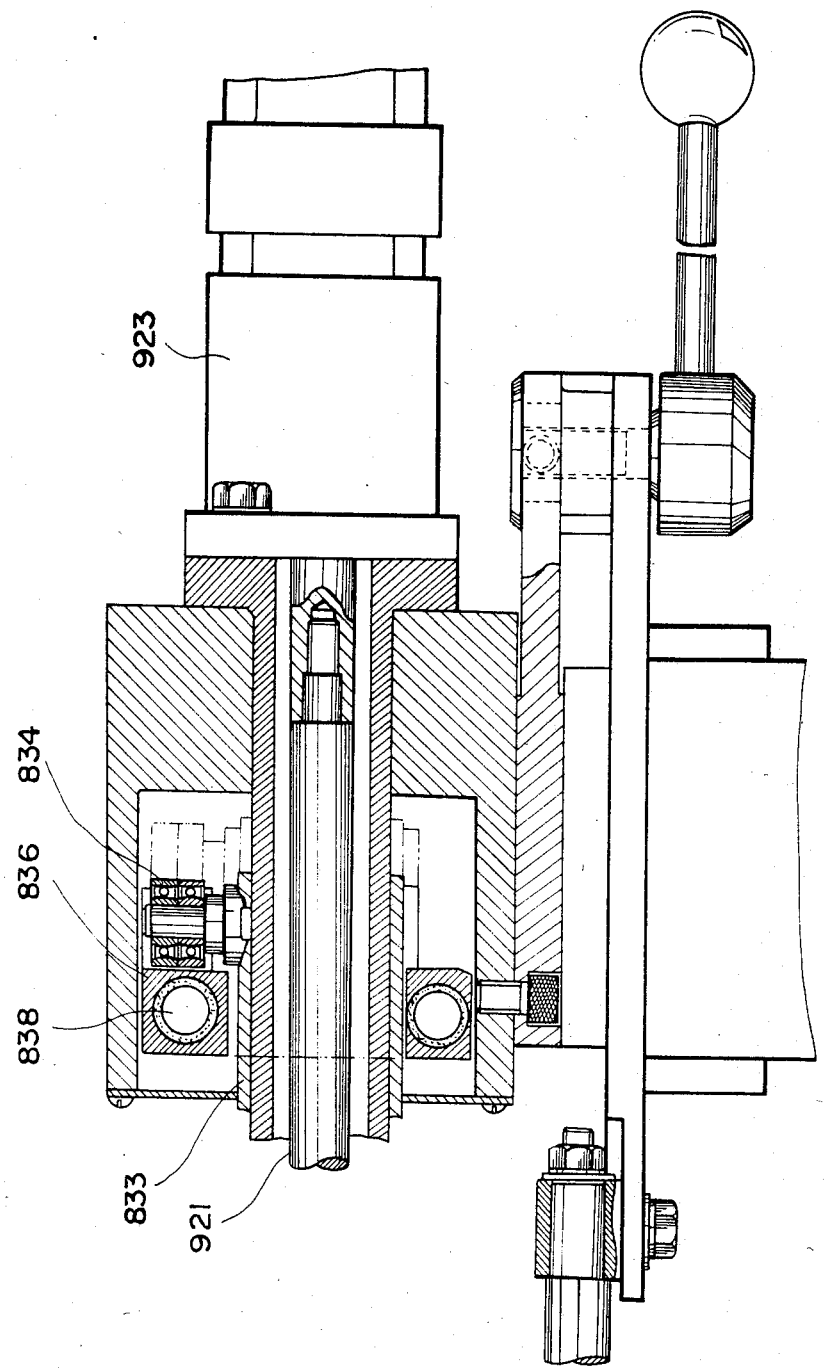
FIG. 10 is a longitudinal sectional view illustrating a cam mechanism for the chuck shown in FIG. 9.

A third embodiment of the present invention is illustrated in FIG. 8. Though the support unit 1 and clamping unit 2 are constructed as separate entities, the arrangement is fundamentally similar to that of the second embodiment in that both units are advanced and retracted in unison by the rod 41 in order to connect the leading end of the shirred casing to the nozzle. The difference between the two embodiments resides in the provision of aligning means 92 which, as the clamping unit 2 is being advanced, brings the leading end of the clamping unit 2 into perfect coincidence with the position at which the shirred casing is cut, i.e., the position corresponding to the leading end of the casing. This eliminates waste of the casing and enhances the reliability at which the casing is connected to the nozzle. Further, the means for tensioning the casing include a chuck body 83 for grasping the casing before it is withdrawn by the rod 41 constituting the withdrawal mechanism 82. The chuck body 83 comprises an inner gripper 831 and an outer gripper 832 disposed on the inner and outer sides of the casing, respectively, and moved relative to each other to grasp the casing. The aligning means 92 and withdrawal mechanism 82 will be described in further detail with reference to FIGS. 9 through 11.

The aligning means 92 comprises a sensor 922 disposed at the position at which the casing is cut, and a rod 921 connected to the aft portion of the clamping unit 2 for moving the leading end (the head 23 in FIG. 9) of the clamping unit 2 up to the position of the sensor 922. The rod 921 has its aft end coupled to an aligning cylinder 923 and is so adapted as to be movable forwardly, independently of the support 1, by the cylinder 923 during the aligning operation. Before the clamping unit 2 is advanced for the purpose of connecting the shirred casing to the nozzle, a distance L, which is measured between the position of the leading end of the clamping unit and the position at which the casing is cut, is inconstant because the distance over which the clamping unit 2 is withdrawn to tension the casing differs from product to product, i.e., depending upon the size of the meat mass extruded with each stuffing operation. Accordingly, the rod 921 is advanced by the aligning cylinder 923 until a signal is produced by the sensor 922, this occurring at the instant the leading end (head 23) of the clamping unit 2 reaches the position of the sensor. The aligning cylinder 923 is deactivated in response to the signal and, hences, halts the clamping unit at the abovementioned position. Next, the clamping unit 2 is advanced together with the support 1 by actuating the cylinder 40 to connect the casing to the nozzle. However, since the position of the clamping unit 2 relative to the rod 41 will differ at the time of the alignment with each stuffing operation, as described above, the clamping unit must be restored to the prescribed, original positional relationship.

Accordingly, the clamping unit 2, which is now at the aligned position, is returned to the original position by actuating the cylinder 923 before or during the advance of the rod 41 for the purpose of connecting the casing to the nozzle. If the apparatus is provided with a function for advancing the clamping unit 2 by, e.g., a motor-driven ball screw mechanism instead of the cylinder 40 while distance is computed, the clamping unit 2 can be advanced in the direction for connecting the casing upon effecting an offset equivalent to the amount of retraction to the original position. It should be noted that the means such as a proximity switch or photoelectric switch can be used as the sensor 922.

As mentioned above, the chuck body 83 of the withdrawal mechanism 82 comprises the inner and outer grips 831, 832. The inner grip 831 is connected to a withdrawing member 833, which serves also as the support 1, and is withdrawn by a cam mechanism illustrated in FIGS. 10 and 11. More specifically, a cam roller 834 is attached to the aft end of the withdrawing member 833. A cam 836, which cooperates with the cam roller 834, has an inclined cam face 836', and is slid along a shaft 838 by a cylinder 837. The inner grip 831 has an oblique surface 831' on the edge of its aft end for coming into surface contact with an oblique surface 832' of the outer grip 832. The latter serves also as the resisting body 3. More specifically, the outer grip 832 is formed of a plate-shaped member having an aperture. The member constitutes a resisting body whose rear face comes into abutting contact with the folds in the wall of the shirred casing when the grip 832 is retracted following connection of the casing to the nozzle. The oblique surface 832', formed on the rim of the aperture on the forward side of the outer grip 832, cooperates with the oblique surface 831' of the inner grip 831 to grasp the casing 5 during withdrawal.

Figure 11:
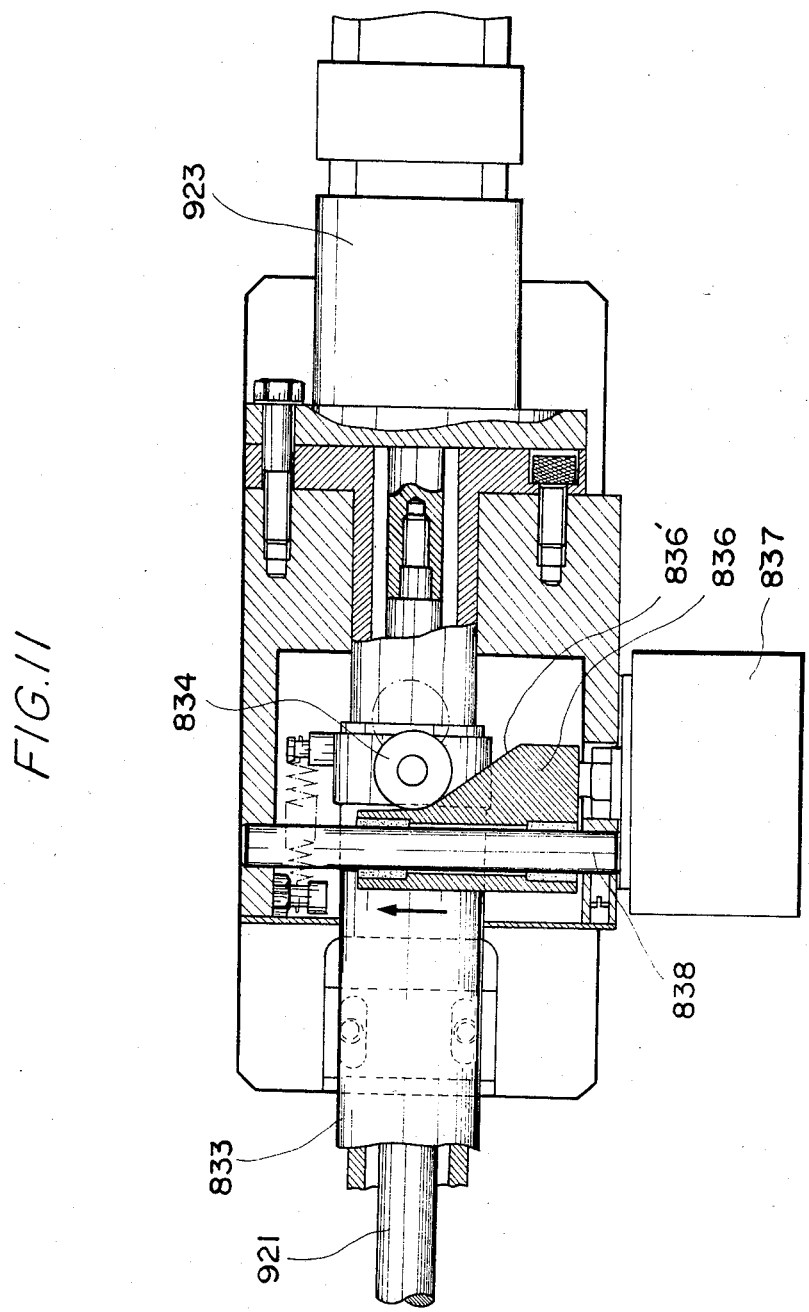
FIG. 11 is a transverse sectional view of the cam mechanism shown in FIG. 10.

The withdrawal operation for tensioning the casing 5 is performed in the following manner. First, the cylinder 837 is actuated to move the cam 836 upwardly, i.e., in the direction of the arrow, as shown in Fig. 11. This causes the cam surface 836' to push the cam roller 834 to the right, or retracting direction, thereby retracting the withdrawing member 833 so that the casing 5 is grasped by the oblique surfaces 831', 832' of the inner and outer grips 831, 832 shown in FIG. 9. This completes the preparations for withdrawal of the casing. Next, by retracting the rod 41, the support 1 and clamping unit 2 are retracted together to actually withdraw the casing.

Reference will now be had to FIG. 12 to describe a fourth embodiment of the present invention. This embodiment is fundamentally similar to the second embodiment in that the support 1 and clamping unit 2 are advanced and retracted together in the operation for connecting the shirred casing 5 to the nozzle. The present embodiment is characterized in that the support 1 supporting the shirred casing 5 from the inner side is provided with a bore 15 serving as a transmission element, fluid pressure is introduced into the bore 15 from the pressurizing port 14, and the clamping mechanism 22, which receives the force produced by the fluid pressure as a linearly acting force, converts this force into a force directed outwardly of the shirred casing in order to hold the same. The clamping mechanism itself is of a construction identical with the clamping mechanism of the first embodiment, as illustrated in FIG. 4. However, the transmission element for driving the clamping mechanism 22 differs in that the cylinder chamber 221 for slidingly guiding the piston 228 is extended in length to form the elongate bore 15 of the support 1. This arrangement makes it possible to advance and retract the clamping unit 2 and support 1 in unison and, at the same time, to dispense with the rod 41 of the first embodiment and, hence, the guide pipe 13 along which the rod 41 slides. The resisting body 3 is disposed to resist the folded wall of the shirred casing 5 at the leading end thereof. Connected to the resisting body 3 is a support rod 31 moved fore and aft by a cylinder 927. A sensor 925, such as a proximity switch, is attached to the distal end of a bar 926 integral with the support 1 and is disposed immediately below the leading end of the clamping unit 2, namely the tip of the head 23 thereof, for sensing said leading end. According to this arrangement, the sensor 925 is at a position corresponding to the leading end of the clamping unit 2 at all times. The operation of the cylinder 927 is halted in response to a signal produced by the sensor 925 when the leading end of the clamping unit 2 is sensed. The clamping mechanism 22 of the clamping unit is in the reclined or non-expanded state and, hence, removes the holding force from the casing 5, when alignment is to be performed, namely when the resisting body 3 is to be retracted. In the operation of the aligning means, described above, the clamping mechanism 22 removes the holding force from the casing, and the resisting body 3 is retracted by the cylinder 927. This causes the resisting body 3 to engage the folded wall of the shirred casing and pull the casing backwardly, so that the leading end of the casing also is moved in the backward direction. When the leading end of the casing is pulled backwardly beyond the tip of the head 23, the sensor 925 senses the leading end of the clamp 2 and produces a signal in response to which operation of the cylinder 926 is halted. This completes the aligning operation. It should be noted that the sensor 925 may be a photoelectric switch or any other well-known sensor.

Where a meat mass has an extremely irregular shape, air may remain entrapped within the casing if use is made solely of the above-described casing tensioning means. Therefore, if a vacuum deaerator for extracting air from the casing is connected to the apparatus and used conjointly with the casing tensioning means, perfect deaeration can be achieved in all cases to prevent any deterioration in the quality of the encased meat mass.

Thus, the meat packing apparatus of the present invention employs shirred casing delivery means which operates by disposing the shirred casing 5 at a position forwardly of the direction in which the meat is extruded from the nozzle 6, holding the casing from the inner side thereof by the clamping unit 2 on the side facing the nozzle, advancing the clamping unit 2 to connect the casing 5 to the nozzle 6, and forming the casing into the deshirred tubular portion 51. This allows the casing to be stuffed with meat extruded from the nozzle the inner diameter whereof approximates that of the straight tubular portion 51, thereby improving packing efficiency to a great degree. In addition, the effectiveness of the overall operation is enhanced because packing is performed continuously in automatic fashion. Further, since the apparatus enables shirred casings of different inner diameters to be stuffed with meat without requiring any changing of parts, the apparatus is simplified in construction and made easier operate. In addition to making continuous stuffing possible, the invention makes it possible to align the leading end of the clamping unit with the position at which the casing is cut. This eliminates casing loss so that the shirred casing can be used with greater economy.

As many apparently widely different embodiments of the present invention can be made without departing from the spirit and scope thereof, it is to be understood that the invention is not limited to the specific embodiments thereof except as defined in the appended claims.

What we claim is:

1. A meat packing apparatus for connecting a shirred casing to a nozzle and stuffing the casing with meat extruded from the nozzle, comprising:

shirred casing delivery means for connecting the shirred casing to the nozzle by advancing the shirred casing toward the nozzle from a position forward of the direction in which meat is extruded from the nozzle, and for forming a portion of the shirred casing, which is located immediately rearward of the portion thereof connected to the nozzle, into a straight, tubular portion;

fastening means having a first fastening unit for closing and fastening an end of the straight, tubular portion of the shirred casing on the nozzle side of a meat mass stuffed into the straight, tubular portion from the nozzle, and a second fastening unit for closing and fastening the end of the straight, tubular portion of the shirred casing on the side of the meat mass opposite the nozzle;

shirred casing tensioning means having a constricting mechanism for constricting the diameter of the straight, tubular portion of the shirred casing on the side of the meat mass opposite the nozzle, and a withdrawal mechanism which cooperates with said constricting mechanism for pulling the straight, linear portion of the shirred casing backwardly in a direction away from the nozzle; and cutting means for cutting the shirred casing at a position rearward of said second fastening unit;

said shirred casing delivery means including:

supporting means for supporting the shirred casing from the inner side thereof at a position forward of the direction in which the meat is extruded from the nozzle;

clamping means for holding the shirred casing at the end of the casing facing the nozzle, said clamping means including a movable portion being reversibly expandable within said casing, said movable portion when expanded holding said casing by pressing the shirred casing from the inner side thereof;

drive means for advancing said clamping toward the nozzle, said clamping means holding and advancing said casing, to connect said end of the shirred casing to the nozzle and for subsequently retracting said clamping means;

means for retaining said casing in said connected condition to said nozzle; and resisting means for resistively engaging the wall of the shirred casing when said clamping means is moved in said advancing and retracting directions, and for, forming the shirred casing into the straight, tubular portion.

2. The meat packing apparatus according to claim 1, wherein said drive means includes:

a linearly movable element connected to said clamping means and penetrating the interior of the shirred casing supported by said supporting means, said supporting means being stationary; and a drive source for driving said linearly movable element from behind to reciprocate said element;

said resisting means being stationary and resistively engaging the wall of the shirred casing when the shirred casing is advanced.

3. The meat packing apparatus according to claim 2, wherein said movable portion of said clamping means includes a transmission element in juxtaposition with said linearly movable element, and a clamping mechanism for converting a linear force, received from said transmission element into a holding force directed outwardly of said clamping means, the conversion being effected within the shirred casing.

4. The meat packing apparatus according to claim 1, wherein said supporting means and resisting means are advanced and retracted together with said clamping means, said resisting means resistively engaging the wall of the shirred casing when the shirred casing is retracted.

5. The meat packing apparatus according to claim 4, wherein said movable portion of said clamping means includes a transmission element for applying a force and a clamping mechanism for converting a linear force from said transmission element in the shirred casing into a holding force directed outwardly of said clamping means.

6. The meat packing apparatus according to claim 1, wherein said clamping means includes a head portion brought into abutting contact with the nozzle when said clamping means is advanced, at which time said head portion recedes within the shirred casing to project the end of the shirred casing beyond said head portion in order to be fitted over the nozzle.

7. The meat packing apparatus according to claim 4, wherein said clamping means includes aligning means for establishing a prescribed positonal relationship between a leading end of said clamping means and a position at which the shirred casing is cut.

8. The meat packing apparatus according to claim 1, wherein the withdrawal mechansim of said shirred casing tensioning means includes said clamping means, said clamping means holding and retracting the shirred casing.

9. The meat packing apparatus according to claim 1, wherein the withdrawal mechanism of said shirred casing tensioning means comprises inner and outer grips disposed on inner and outer sides of the shirred casing, said inner and outer grips being moved relative to each other for grasping said casing there between, said pulling backward of said shirred casing being effected while grasped by said grippers.

10. The meat packing apparatus according to claim 1, wherein said second fastening means is subject to positioning away from said nozzle by an adjustable distance.

11. The meat packing apparatus according to claim 1 wherein said movable portion includes reversibly expandable leaf springs for pressing said casing from the inner side thereof.

* * * * *

UNITED STATES PATENT AND TRADEMARK OFFICE
CERTIFICATE OF CORRECTION

PATENT NO. : 4,587,689
DATED : May 13, 1986
INVENTOR(S) : MINORU NAKAMURA

It is certified that error appears in the above-identified patent and that said Letters Patent is hereby corrected as shown below:

Column 5, line 66, change "a" to --as--.

Column 8, line 46, change "9" to --49--.

Signed and Sealed this

Twenty-eighth Day of October, 1986

[SEAL]

Attest:

DONALD J. QUIGG

Attesting Officer     Commissioner of Patents and Trademarks